US012600275B2

(12) United States Patent
Kim et al.

(10) Patent No.: US 12,600,275 B2
(45) Date of Patent: Apr. 14, 2026

(54) SEAT ADJUSTMENT APPARATUS FOR VEHICLE

(71) Applicants: Hyundai Motor Company, Seoul (KR); Kia Corporation, Seoul (KR); Hyundai Transys Inc., Seosan (KR)

(72) Inventors: Mu Young Kim, Osan (KR); Chan Ho Jung, Gunpo (KR); Dong Hoon Keum, Busan (KR); Sang Soo Lee, Hwaseong (KR); Ho Suk Jung, Hwaseong (KR); Sang Do Park, Seoul (KR); Jong Su Kim, Hwaseong (KR); In Hoe Jeong, Hwaseong (KR); Soo Yong Kim, Hwaseong (KR); Jung Eun Kwon, Hwaseong (KR); Dong Jin Kim, Hwaseong (KR); Gwon Hwa Bok, Hwaseong (KR); Jun Sik Hwang, Hwaseong (KR); Cheol Hwan Yoon, Hwaseong (KR)

(73) Assignees: Hyundai Motor Company, Seoul (KR); Kia Corporation, Seoul (KR); Hyundai Transys Inc., Seosan (KR)

( * ) Notice: Subject to any disclaimer, the term of this patent is extended or adjusted under 35 U.S.C. 154(b) by 191 days.

(21) Appl. No.: 18/388,942

(22) Filed: Nov. 13, 2023

(65) Prior Publication Data

US 2025/0026252 A1    Jan. 23, 2025

(30) Foreign Application Priority Data

Jul. 19, 2023    (KR) ........................ 10-2023-0094113

(51) Int. Cl.
B60N 2/00        (2006.01)
B60N 2/30        (2006.01)

(52) U.S. Cl.
CPC ......... B60N 2/3061 (2013.01); B60N 2/3093 (2013.01)

(58) Field of Classification Search
CPC .. B60N 2/3054; B60N 2/3061; B60N 2/3088; B60N 2/309; B60N 2/3093
See application file for complete search history.

(56) References Cited

U.S. PATENT DOCUMENTS 10,118,506 B2 *  11/2018  Hattori .................. B60N 2/073
10,486,559 B2 *  11/2019  Matsui ................ B60N 2/1615
10,857,910 B2 *  12/2020  Madhu .................. B60N 2/075
10,919,415 B2 *   2/2021  Emrich ............... B60N 2/0705
(Continued)

FOREIGN PATENT DOCUMENTS

JP        2009-202844 A      9/2009

*Primary Examiner* — Chi Q Nguyen
(74) *Attorney, Agent, or Firm* — Fox Rothschild LLP

(57)        ABSTRACT

A seat adjustment apparatus for a vehicle includes a plurality of connection frames provided along two opposite sides of a seat frame and two opposite sides of a back frame and configured to move forward or rearward depending on a folding direction of the back frame, guide parts provided at middle points of the plurality of connection frames and configured to be moved upward or downward by forward or rearward movements of the connection frames, and a seat cushion pipe provided inside the two connection frames and configured such that front ends of the seat cushion pipe are connected to the guide parts, and a position of a rear end of the seat cushion pipe is adjusted upward or downward by upward or downward movements of the guide parts.

14 Claims, 4 Drawing Sheets

(56) References Cited

U.S. PATENT DOCUMENTS

| | | | | |
|---|---|---|---|---|
| 12,122,265 | B2 * | 10/2024 | Xiao | B60N 2/073 |
| 12,280,734 | B2 * | 4/2025 | Lee | B60R 22/26 |
| 2015/0307006 | A1 * | 10/2015 | Hayashi | B60N 2/0702 |
| | | | | 297/344.13 |
| 2018/0065509 | A1 * | 3/2018 | Ohashi | B60N 2/1615 |
| 2018/0215288 | A1 * | 8/2018 | Hiemstra | B60N 2/20 |
| 2019/0061567 | A1 * | 2/2019 | Masuda | B60N 2/0705 |
| 2019/0092191 | A1 * | 3/2019 | Bouzid | B60N 2/02246 |
| 2019/0143851 | A1 * | 5/2019 | Handigol | B60N 2/20 |
| | | | | 297/341 |
| 2022/0118891 | A1 * | 4/2022 | Kim | B60N 2/02246 |

* cited by examiner

SEAT ADJUSTMENT APPARATUS FOR VEHICLE

CROSS REFERENCE TO RELATED APPLICATION

The present application claims under 35 U.S.C. § 119(a) the benefit of Korean Patent Application No. 10-2023-0094113, filed on Jul. 19, 2023, the entire contents of which are incorporated by reference herein.

BACKGROUND

(a) Technical Field

The present disclosure relates to a seat adjustment apparatus for a vehicle, more particularly, to the seat adjustment apparatus in which a position of a rear end of a seat cushion pipe is adjusted upward or downward depending on a folding direction of a back frame, such that a lower space may be ensured.

(b) Description of the Related Art

In general, a vehicle (e.g., a mobility) includes front seats in which a driver and an assistant (or other occupant) are seated, and rear seats disposed rearward of the front seats and configured to allow an additional occupant to be seated in the rear seats. Various convenience devices are installed in the seat to improve the convenience for the occupants.

Examples of the convenience device mounted in the seat include: a seat position adjustment device configured to adjust a position of the seat by moving the seat in a forward/rearward direction in accordance with an occupant's body type; a reclining device configured to adjust a gradient of a seatback; a height device configured to adjust a height of the seat; and a tilting device configured to adjust a tilting angle of the seat.

In general, a seat of a vehicle includes a seatback configured to support an upper body of a passenger, a seat cushion configured to support a lower body of the passenger, and a headrest configured to support a head. The seatback and the seat cushion define a structure in which a back frame and a seat frame constitute a framework.

In addition, a fold-and-drive function applied to a rear seat of an SUV may ensure an interval between a seat cushion and a back frame when the back frame is folded forward, which provides an advantage in that a rear loading space of the vehicle is ensured.

However, in the case of the seat adjustment apparatus in the related art, the seat cushion is directed downward when the back frame is folded forward. For this reason, there is a problem in that a lower space of the seat cushion is insufficient, which makes it difficult to provide a component for a separate function in the lower space.

Therefore, there is a need for a solution that ensures the lower space of the seat cushion by adjusting a position of a seat cushion pipe depending on a folding direction of the back frame.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a seat adjustment apparatus for a vehicle (e.g., a mobility), in which a position of a rear end of a seat cushion pipe is adjusted upward or downward depending on a folding direction of a back frame, such that a lower space may be ensured.

To achieve the above-mentioned object, the present disclosure provides a seat adjustment apparatus for a vehicle, the seat adjustment apparatus including: a plurality of connection frames provided along two opposite sides of a seat frame and two opposite sides of a back frame and configured to move forward or rearward depending on a folding direction of the back frame; guide parts operably connected to (e.g., provided at middle points of) the plurality of connection frames and configured to be moved upward or downward by forward or rearward movements of the connection frames; and a seat cushion pipe operably connected to (e.g., provided inside) the two connection frames and configured such that (e.g., front ends of) the seat cushion pipe are connected to the guide parts, and a position of a rear end of the seat cushion pipe is adjusted upward or downward by upward or downward movements of the guide parts.

For example, a plurality of connection frames may include: front frames provided at a front side and disposed along the two opposite sides of the seat frame; and rear frames provided at a rear side, disposed along the two opposite sides of the seat frame and the two opposite sides of the back frame, and connected to the front frames.

For example, the front frame and the rear frame may move forward when the back frame is folded forward, and the front frame and the rear frame may move rearward when the back frame is folded rearward.

For example, a rear end of the guide part may move upward when the front frame and the rear frame move forward, and the rear end of the guide part may move downward when the front frame and the rear frame move rearward.

For example, the guide part may be provided at a point at which the front frame and the rear frame are connected to each other.

For example, the guide part may include: a guide bracket having a slot groove; and an intermediate link having one side connected to the front frame, and the other side connected to the slot groove, and the intermediate link may move forward or rearward in the slot groove depending on the folding direction of the back frame.

For example, the front end of the seat cushion pipe may be coupled and coupled to the guide bracket by welding.

For example, the intermediate link may move rearward in the slot groove when the back frame is folded forward, and the intermediate link may move forward in the slot groove when the back frame is folded rearward.

For example, two opposite ends of the seat cushion pipe may be connected to the guide parts, and a central portion of the seat cushion pipe may be formed in a shape recessed toward a rear side of the seat frame.

For example, the seat adjustment apparatus may further include: a drive link provided forward of the guide part and connected to the front frame and configured to be rotatable by forward or rearward movements of the front and rear frames, in which when the back frame is folded forward or rearward, the drive link rotates and allows the seat frame to move downward or upward.

According to the seat adjustment apparatus for a vehicle of the present disclosure, the position of the rear end of the seat cushion pipe is adjusted upward or downward depending on the folding direction of the back frame, such that the lower space may be ensured when the back frame is folded forward, and the relaxation mode may be implemented when the back frame is folded rearward.

A vehicle may include the seat adjustment apparatus.

The effects capable of being obtained by the present disclosure are not limited to the aforementioned effects, and other effects, which are not mentioned above, will be clearly understood by those skilled in the art from the following description.

DETAILED DESCRIPTION OF THE DISCLOSURE

Figure 1:
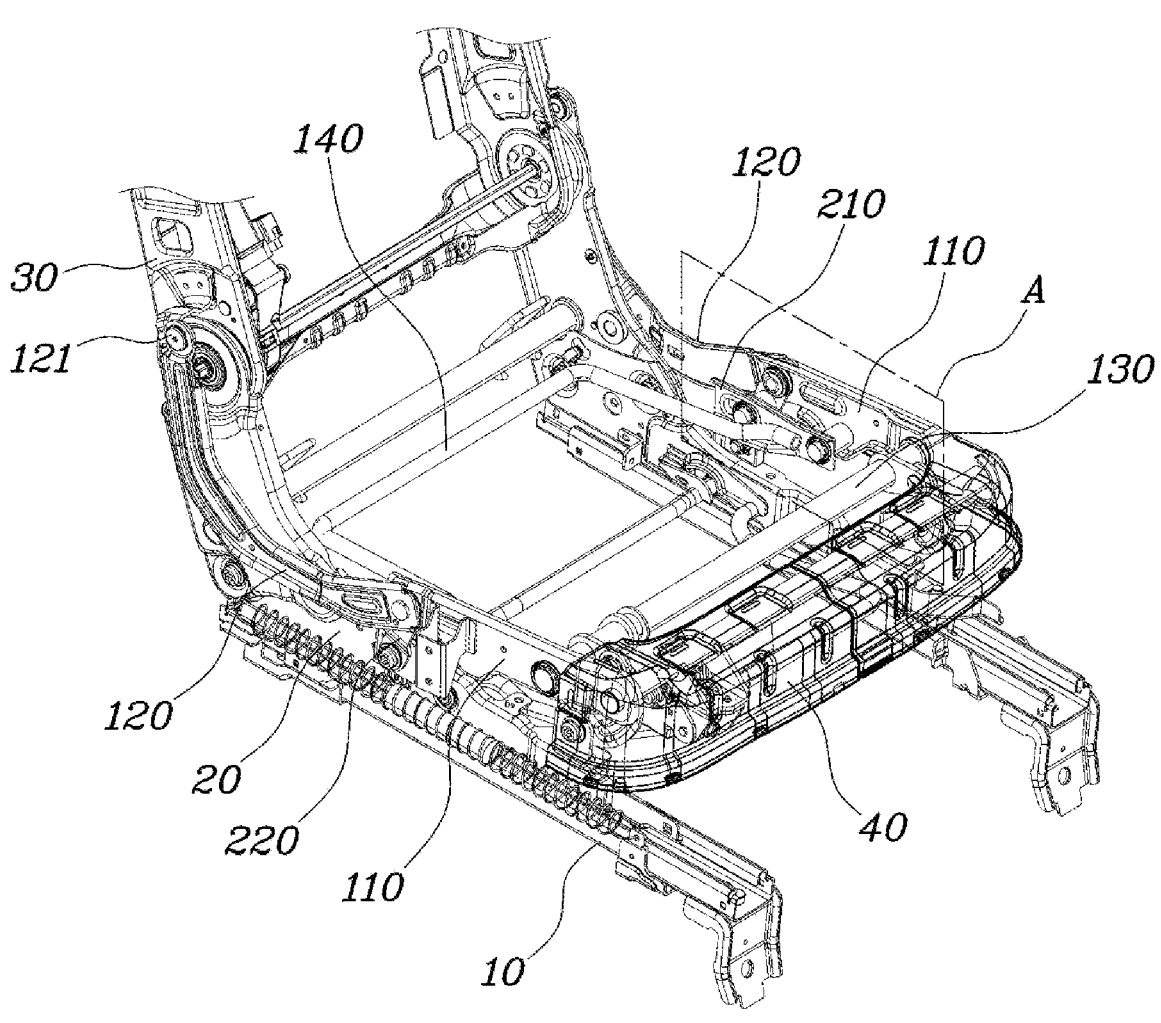
FIG. 1 is a view illustrating a seat adjustment apparatus for a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", "portion" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments disclosed in the present specification will be described in detail with reference to the accompanying drawings. The same or similar constituent elements are assigned with the same reference numerals regardless of reference numerals, and the repetitive description thereof will be omitted.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure. The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

An embodiment of the present disclosure provides a configuration in which a position of a rear end of a seat cushion pipe is adjusted upward or downward depending on whether a back frame is folded, such that a lower space may be ensured when the back frame is folded forward, and a relaxation mode may be implemented when the back frame is folded rearward.

FIG. 1 is a view illustrating a seat adjustment apparatus for a vehicle according to an embodiment of the present disclosure. FIG. 1 is mainly focused on constituent elements related to the present embodiment. However, an actually implemented seat adjustment apparatus may, of course, include more or fewer constituent elements.

With reference to FIG. 1, the seat adjustment apparatus according to the embodiment may include a plurality of connection frames 110 and 120, guide parts 210 and 220, and a seat cushion pipe 140.

A seat frame 20 supports a cushion seat of a vehicle and is coupled to seat rails 10 in an upward/downward direction. The seat frame 20 is installed above the seat rails 10 and configured to slide in a forward/rearward direction. A back frame 30 may be coupled to a rear end of the seat frame 20 of the vehicle and configured to be folded forward or rearward. In this case, as rotary hinges 121 disposed on lateral sides of the back frame 30 move forward, the plurality of connection frames 110 and 120 moves forward. Therefore, as drive links 131 to be described below rotate clockwise, a fixing bar 130 moves downward, such that the seat cushion moves downward.

The plurality of connection frames 110 and 120 may be provided along two opposite sides of the seat frame 20 and two opposite sides of the back frame 30. In this case, the plurality of connection frames 110 and 120 may each include two frames, i.e., a front frame 110 and a rear frame 120. The front frames 110 are provided at a front side and disposed along the two opposite sides of the seat frame 20. The rear frames 120 are provided at a rear side, disposed along the two opposite sides of the back frame 30, and connected to the front frames 110. The rear frame 120 is rotatably connected to the front frame 110. The front frame 110 and the rear frame 120 move forward or rearward depending on a folding direction of the back frame 30. In addition, a cushion panel 40 is provided at a front end of the front frame 110 and covers an outer side of the seat frame 20, thereby improving the rigidity of a front end of the seat frame 20.

When the back frame 30 is folded forward, the front frame 110 and the rear frame 120 are disposed above the seat rail 10 and moved forward. When the back frame 30 is folded rearward, the front frame 110 and the rear frame 120 are moved rearward. Therefore, the guide parts 210 and 220 move upward or downward, such that the position of the seat cushion pipe 140 may be adjusted by the movements of the guide parts 210 and 220.

Hereinafter, this configuration will be described in detail with reference to FIG. 2.

Figure 2:
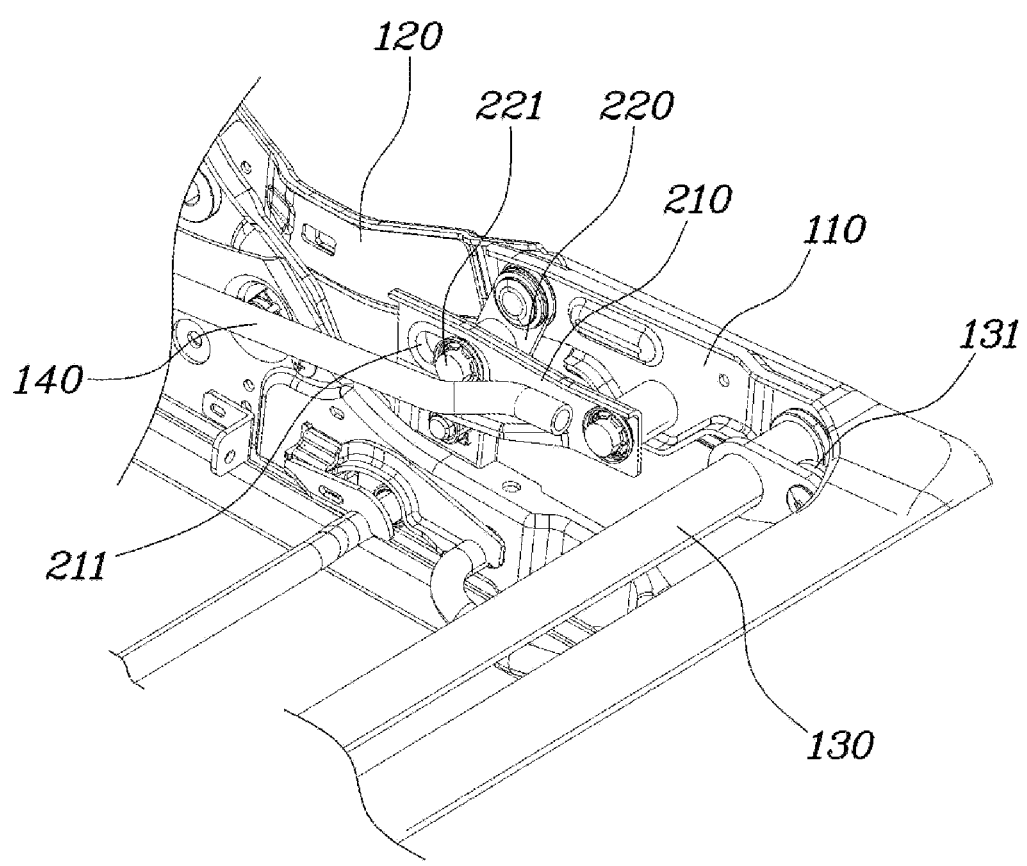
FIG. 2 is an enlarged view of region A in FIG. 1.

FIG. 2 is an enlarged view of region A in FIG. 1.

With reference to FIG. 2, the guide parts 210 and 220 move upward when the front frame 110 and the rear frame 120 move forward. The guide parts 210 and 220 move downward when the front frame 110 and the rear frame 120 move rearward. The guide parts 210 and 220 are provided at a point at which the front frame 110 and the rear frame 120 are connected to each other. The guide parts 210 and 220 serve to adjust the position of the seat cushion pipe 140.

The guide parts 210 and 220 may include a guide bracket 210 and an intermediate link 220. A slot groove 211 is formed in the guide bracket 210. One side of the intermediate link 220 is connected to the front frame 110, and the other side of the intermediate link 220 is connected to the slot groove 211. With reference to FIG. 2, it can be ascertained that one side of the intermediate link 220 is connected to the slot groove 211 by means of a fastening guide 221. The intermediate link 220 moves rearward in the slot groove 211 when the folding direction of the back frame 30 is the forward direction. The intermediate link 220 moves forward in the slot groove 211 when the folding direction is the rearward direction. In case that the forward or rearward movement of the intermediate link 220 is completed, the position of the intermediate link 220 is restricted in the slot groove 211, such that the folding of the back frame 30 is completed. In particular, the rear end of the guide bracket 210 moves upward or downward when the front frame 110 and the rear frame 120 move forward or downward.

Further, the drive link 131 may be provided forward of the guide parts 210 and 220 and connected to the front frame 110 so as to be rotatable in accordance with the forward or rearward movements of the front frame 110 and the rear frame 120. The drive link 131 serves to rotate and allow the seat frame 20 to move downward or upward when the back frame 30 is folded forward or rearward. Therefore, in the state in which the folding of the back frame 30 is completed, an interior space is expanded, which improves convenience for a passenger.

Figure 3:
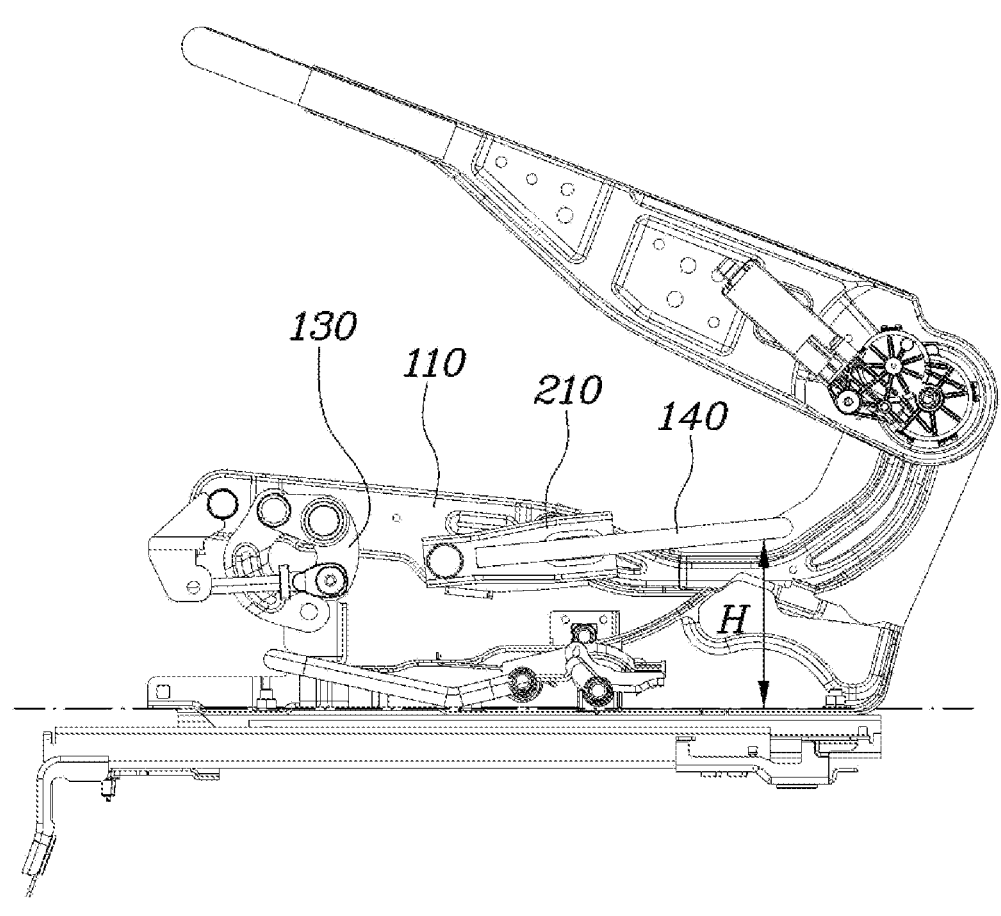
FIG. 3 is a view illustrating a state in which a position of a rear end of a seat cushion pipe is adjusted upward when a back frame according to the embodiment of the present disclosure is folded forward.

FIG. 3 is a view illustrating a state in which a position of the rear end of the seat cushion pipe 140 is adjusted upward when the back frame 30 according to the embodiment of the present disclosure is folded forward.

With reference to FIG. 3, two opposite ends of the seat cushion pipe 140 may be connected to the guide parts 210 and 220, and a central portion of the seat cushion pipe 140 may be formed in a shape recessed toward the rear side of the seat frame 20 and provided inside the connection frames 110 and 120 at the two opposite sides.

In particular, the front ends of the seat cushion pipe 140 are coupled and connected to the guide brackets 210 by welding. Therefore, when the rear ends of the guide brackets 210 move upward or downward, heights of the rear ends of the guide brackets 210 may be adjusted in the upward/downward direction. When the back frame 30 is folded forward, the rear end of the seat cushion pipe 140 moves upward, such that the lower space of the seat frame 20 may be ensured. Therefore, a space for the feet of the passenger in the rear seat may be ensured, and other components for convenience functions may be mounted. As illustrated in FIG. 3, in case that the rear end of the seat cushion pipe 140 moves upward by a height H based on a floor of a vehicle body, a space for components such as a blower, an ECU, and an actuator may be ensured below the seat frame 20, and the user's convenience may also be improved. In this case, only the rear end of the seat cushion pipe 140 moves upward, such that only the rear side of the seat cushion locally moves upward.

Figure 4:
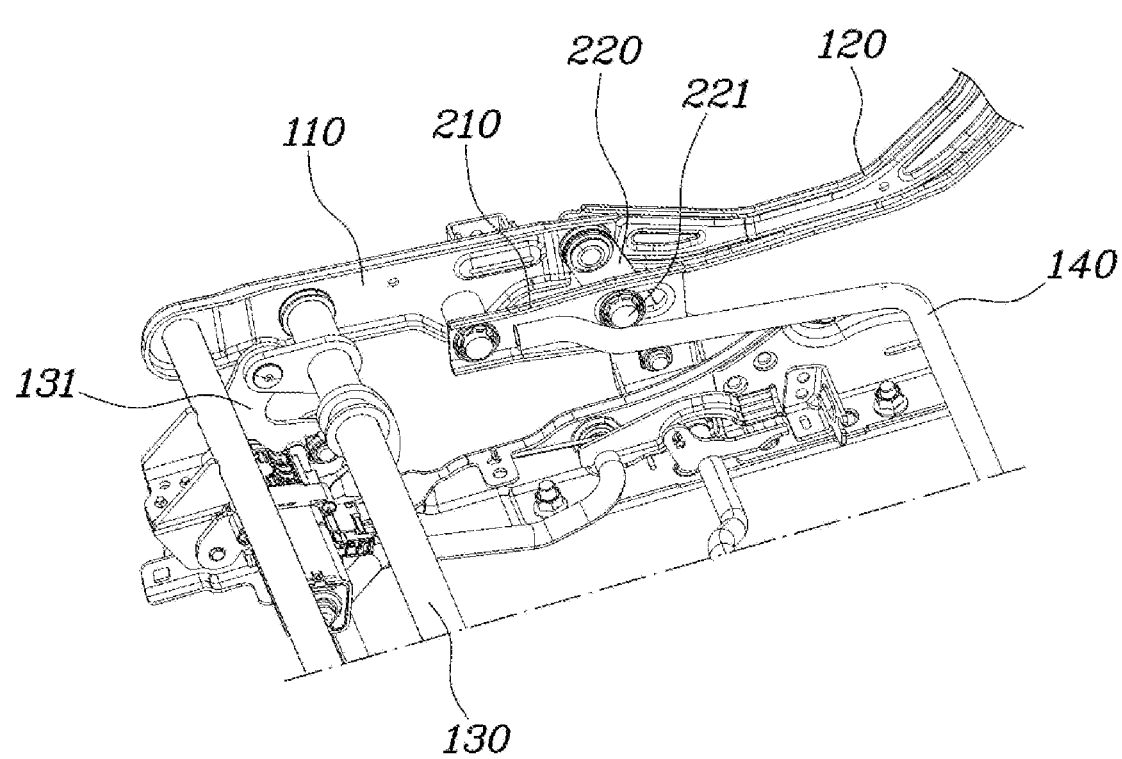
FIG. 4 is a view illustrating a state in which a position of the rear end of the seat cushion pipe is adjusted downward as the back frame is folded rearward in a relaxation mode according to the embodiment of the present disclosure.

FIG. 4 is a view illustrating a state in which a position of the rear end of the seat cushion pipe 140 is adjusted downward as the back frame 30 is folded rearward in a relaxation mode according to the embodiment of the present disclosure.

With reference to FIG. 4, a state in which the back frame 30 is folded rearward is a relaxation mode. In the relaxation mode, the front frame 110 and the rear frame 120 move rearward, and the guide parts 210 and 220 move rearward and downward, such that the rear end of the seat cushion pipe 140 is directed downward. With the above-mentioned structure, the relaxation mode, which is implemented as the back frame 30 is folded rearward, may be maintained without change. The lower space may be ensured when the back frame 30 is folded forward.

According to the embodiments of the present disclosure described above, the position of the rear end of the seat cushion pipe 140 is adjusted upward or downward depending on the folding direction of the back frame 30, such that the lower space may be ensured when the back frame 30 is folded forward, and the relaxation mode may be implemented when the back frame 30 is folded rearward.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:
1. A seat adjustment apparatus for a vehicle, the seat adjustment apparatus comprising:
    a plurality of connection frames provided along each of two opposite sides of a seat frame and two opposite sides of a back frame and configured to move forward or rearward depending on a folding direction of the back frame;

guide parts operably connected to the plurality of connection frames and configured to be moved upward or downward by forward or rearward movements of the connection frames; and a seat cushion pipe operably connected to the plurality of connection frames and configured such that the seat cushion pipe is connected to the guide parts, and a position of a rear end of the seat cushion pipe is adjusted upward or downward by upward or downward movements of the guide parts.

2. The seat adjustment apparatus of claim 1, wherein the guide parts are provided at middle points of one of the plurality of connection frames.

3. The seat adjustment apparatus of claim 1, wherein the seat cushion pipe is provided inside the plurality of connection frames.

4. The seat adjustment apparatus of claim 3, wherein front ends of the seat cushion pipe are connected to the guide parts.

5. The seat adjustment apparatus of claim 1, wherein the plurality of connection frames comprises:

front frames provided at a front side and disposed along the two opposite sides of the seat frame; and rear frames provided at a rear side, disposed along the two opposite sides of the seat frame and the two opposite sides of the back frame, and connected to the front frames.

6. The seat adjustment apparatus of claim 5, wherein the front frames and the rear frames move forward in response to the back frame being folded forward, and wherein the front frames and the rear frames move rearward in response to the back frame being folded rearward.

7. The seat adjustment apparatus of claim 6, wherein a rear end of one of the guide parts moves upward in response to the front frames and the rear frames moving forward, and wherein the rear end of the one of the guide parts moves downward in response to the front frames and the rear frames moving rearward.

8. The seat adjustment apparatus of claim 5, wherein the guide parts are provided at points where the front frames and the rear frames are connected to each other.

9. The seat adjustment apparatus of claim 8, wherein each of the guide parts comprises:

a guide bracket having a slot groove; and an intermediate link having one side connected to the front frames, and the other side connected to the slot groove, and wherein the intermediate link moves forward or rearward in the slot groove depending on the folding direction of the back frame.

10. The seat adjustment apparatus of claim 9, wherein the front end of the seat cushion pipe is coupled to the guide bracket by welding.

11. The seat adjustment apparatus of claim 5, further comprising:

drive links provided forward of the guide parts and connected to the front frames and configured to be rotatable by forward or rearward movements of the front and rear frames, wherein in response to the back frame being folded forward or rearward, the drive links rotate and allows the seat frame to move downward or upward.

12. The seat adjustment apparatus of claim 1, wherein the intermediate link moves rearward in the slot groove in response to the back frame being folded forward, and wherein the intermediate link moves forward in the slot groove in response to the back frame being folded rearward.

13. The seat adjustment apparatus of claim 1, wherein two opposite ends of the seat cushion pipe are connected to the guide parts, and a central portion of the seat cushion pipe is formed in a shape recessed toward a rear side of the seat frame.

14. A vehicle comprising the seat adjustment apparatus of claim 1.

* * * * *